R. VOSE.

Car Spring.

No. { 89, / 1,194. }

Reissued June 4, 1861.

Witnesses:

J. W. Howard

Chas F. Jansbury

Inventor:

Richard Vose.

By his atty T. C. Robbins

AM. PHOTO-LITHO. CO. N.Y. (OSBORNE'S PROCESS.)

UNITED STATES PATENT OFFICE.

RICHARD VOSE, OF NEW YORK, N. Y.

IMPROVED CAR-SPRING.

Specification forming part of Letters Patent No. 26,723, dated January 3, 1860; Reissue No. 1,194, dated June 4, 1861.

*To all whom it may concern:*

Be it known that I, RICHARD VOSE, of the city, county, and State of New York, have invented a new and Improved Car Spring; and I do hereby declare that the following is a full and exact description thereof, reference being had to the accompanying drawings, which form a part of this specification, in which—

Figure 2:
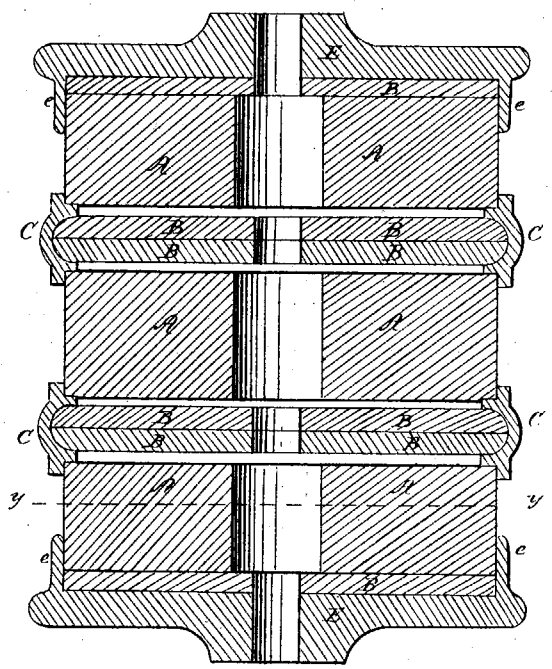
Figure 1:
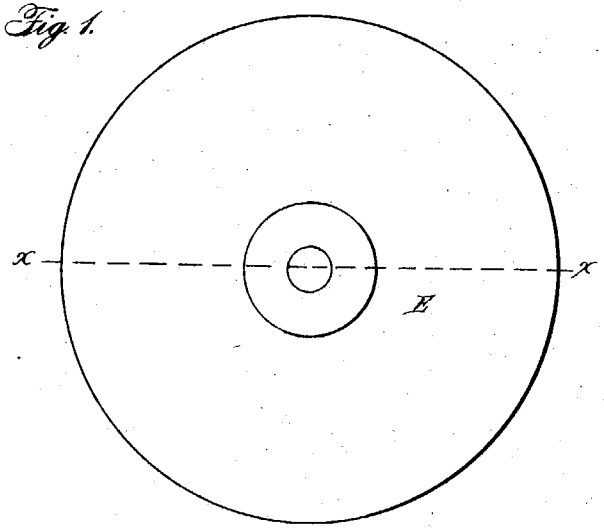
Figure 3:
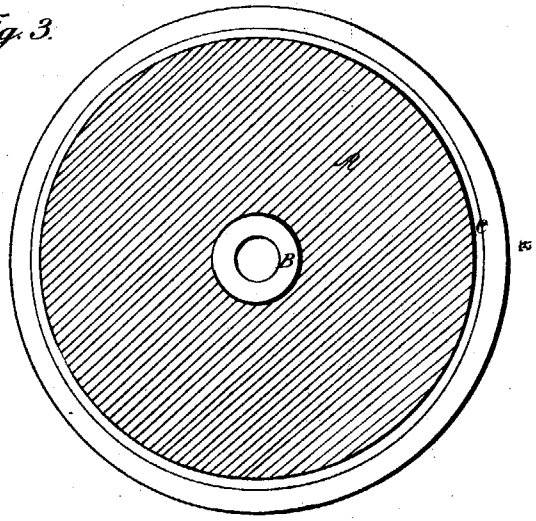

Figure 1 is a view of one end of my improved car-spring; Fig. 2, a longitudinal section in the line *x x* of Fig. 1, and Fig. 3 a transverse section in the line *y y* of Fig. 2.

It is well known that if disks of india-rubber are brought into direct contact with plates of iron in the construction of car-springs the said rubber disks will soon be greatly injured by the chemical influence exerted by the oxidation of the iron. It is also well known that if an india-rubber spring be exposed to violent concussions when compressed between unyielding surfaces the periphery of said spring will soon show numerous fractures, a sure precursor of its utter failure to any longer serve the purpose of a spring.

To remedy the aforesaid defects in india-rubber car-springs is the object of my present invention, and this I accomplish by placing each disk or layer of india-rubber in a car-spring between interposed disks or layers of some fibrous material, such as felting or some other compressible article of a similar nature.

The cavity within the flange *e* of each metallic cap or end plate, E, of my improved car-spring is of sufficient depth to first receive a fibrous disk, B, and then leave a sufficient unappropriated portion of said cavity for the reception and retention of one of the india-rubber disks, A, of said spring.

The fibrous disks B, which are placed between the faces of the india-rubber disks of my improved car-spring, are surrounded by internally-grooved metallic rings C, which embrace the peripheries of the said fibrous disks and protect the same from the action of moisture, while the flanges which project from the upper and lower sides of said rings receive the peripheries of the faces of the india-rubber disks and retain the same in their proper positions, as shown in Fig. 2.

Having thus fully described my improved car-spring, what I claim therein as my invention, and desire to secure by Letters Patent, is—

1. Placing the india-rubber disks of said spring between interposed disks formed of some fibrous material, substantially in the manner and for the purpose herein set forth.

2. When the india-rubber disks in a car-spring are placed between interposed disks formed of some fibrous material, combining internally-grooved metallic rings C C with the peripheries of said disks, substantially in the manner and for the purpose herein set forth.

The above specification of my improved car-spring signed and witnessed this 5th day of June, 1860.

RICHARD VOSE.

Witnesses:

CHARLES D. GIBSON,
ALBERT L. BUTLER.